July 2, 1963  A. KALENIAN  3,096,470
SPEED AND LOAD CONTROL FOR ELECTRIC MOTORS
Filed June 14, 1960
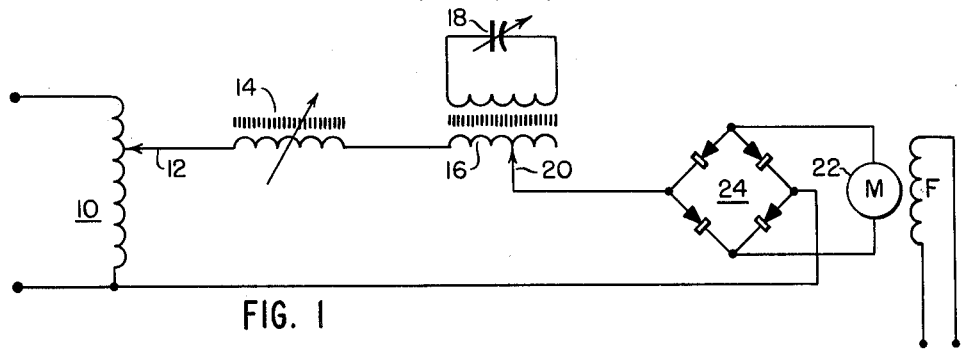
FIG. 1
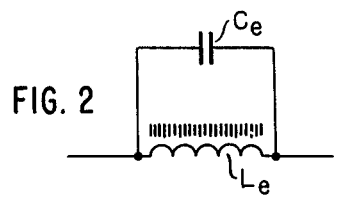
FIG. 2
FIG. 3
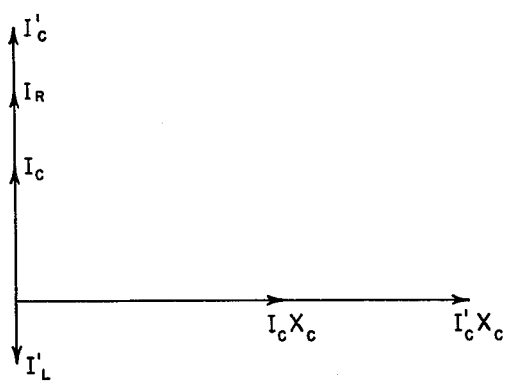
*INVENTOR.*
ARAM KALENIAN
BY *Kenway Jenney*
*Witter & Hildreth*
ATTORNEYS

United States Patent Office 3,096,470
Patented July 2, 1963

3,096,470
SPEED AND LOAD CONTROL FOR ELECTRIC MOTORS
Aram Kalenian, %Vee-Arc Corp., Westboro, Mass.
Filed June 14, 1960, Ser. No. 36,037
2 Claims. (Cl. 318—332)

The present invention relates to motor speed and load controls and more particularly to apparatus of the general type described in my copending application Serial No. 780,322, filed December 15, 1958, now abandoned and continuation thereof, Serial No. 111,425, filed May 16, 1961, issued as Patent No. 3,084,317, April 2, 1963.

The apparatus described in the above mentioned application comprises a motor control circuit which includes a series capacitor and a saturable core inductor. The inductor and capacitor are connected in series. In one form of the invention the circuit is connected with an alternating series motor, and in the preferred form of the invention the control circuit is connected through a rectifying system with a direct current motor. Briefly, the operation depends on the fact that in the saturated region the voltage across the inductor is nearly constant, while the voltage across the capacitor increases with increasing load. By a proper choice of circuit parameters it is possible to provide a motor in which exceptionally good speed regulation will be obtained over a wide range of loads. The speed itself may be varied either by varying the line voltage or by varying the inductance of the control circuit, or both.

It has been found that with large motors capacitors of large size are necessary. Furthermore, conventional capacitors do not lend themselves readily to capacitance variations. It is well known that the effective capacitance of a capacitor may be increased through the medium of a step-up transformer, since the impedance in the secondary circuit of the transformer as seen from the primary side is inversely proportional to the square of the transformation ratio. The present invention utilizes such a step-up transformer and hence permits the use of a capacitor of smaller size than would be required if it were connected directly into the line.

The invention, however, does not depend merely upon the use of a step-up transformer to increase the effective size of the capacitor, but has for its object the provision of such a device in conjunction with a saturable core transformer with the object of limiting the current under what would otherwise be a high current condition, as at starting.

With this object in view the present invention comprises in general the system described in my copending application but with a step-up transformer having a saturable core in series with the motor circuit, the secondary of the transformer having a capacitor which, as seen from the primary of the transformer, provides sufficient effective capacitance to give the speed regulation described in my copending application.

In the accompanying drawings—

FIG. 1 is a diagram of a control system according to the present invention;

FIG. 2 is a diagram of an equivalent circuit for a part of the system; and

FIG. 3 is a vector diagram for explanation of the operation.

The circuit shown in FIG. 1 comprises a transformer 10 connected to the line, the transformer being shown as an auto transformer having a variable tap 12 by which the voltage applied to the motor may be varied. As described in my copending application the purpose of the variable tap 12 is to permit changes of regulated speed, but this result may also be attained through variations of the inductance without changing the applied voltage, and if desired, a direct connection from the line may be made.

In series with the tap 12 is an inductor 14 of the saturable core type having the characteristics described in my copending application, namely, saturation over the normal range of load and speed conditions. The inductor 14 may be variable, as indicated by the arrow.

In series with the inductor 14 is a current transformer 16 having across its secondary a capacitor 18 which may be variable as indicated. The transformer 16 is preferably a step-up transformer, namely, one in which the ratio $a$ of secondary to primary turns is greater than unity so that the effective impedance of the capacitor as seen from the primary side is less than its actual value. A transformation in ratio of 2 has been found to be satisfactory, but it is also desirable to use a variable tap 20 on the primary to vary the effective value of the capacitance. As described in my copending application, a fixed capacitor gives a certain droop in the speed-load regulation curve, and the variation of effective capacitance may be used to compensate for the droop or to provide a desired droop. The capacitor 18 may, according to one arrangement, be variable in steps, and a fine adjustment may be obtained by the tap 20.

Although the primary and secondary of the transformer 16 are shown as being constituted by two separate windings, they may, and preferably are, combined in a single winding as in conventional auto-transformer construction.

The transformer 16 is provided with a core which saturates at current values in excess of running current. In other words, the transformer will not saturate under ordinary running conditions, but is intended to saturate at currents in excess of normal running current.

The control circuit comprising the inductor 14 and the effective capacitance afforded by the step-up transformer 16 and capacitor 18 may be connected in series with any of the motors described in my copending application as, for example, an alternating current series motor. It is preferred, however, to use a direct current motor of the separately excited type. Such a motor is shown at 22 and its armature is energized through a rectifying bridge network 24 of conventional form, while its field F is energized from any suitable independent source, not shown.

As heretofore described, the use of a turns ratio greater than unity permits the use of a condenser smaller than would otherwise be required at 18. The advantages of the present invention, however, do not reside merely in the reduction of the size of the capacitor. The use of a saturating transformer 16 provides for automatic current limitation under starting (or other high-current) conditions.

If a simple series condenser of equivalent size were substiuted for the condenser 18 and transformer 16, the current through the motor would be determined to a considerable extent by the impedance of the circuit formed by the capacitor and the inductor 14. In such a case the net reactance of the circuit would be less than the reactance of the inductor. Since the inductor 14 is intended to saturate at normal load currents, it would be saturated under the starting current condition and hence its inductive reactance would be relatively small. The capacitive reactance under the high current condition might then be such as to reduce the net reactance to a value that would allow excessive current to flow through the system. Under such circumstances it would be necessary to provide some means to reduce the motor voltage and hence limit the starting current.

The present invention provides self-limiting properties by reason of the saturation effects occurring in the transformer 16. To explain this effect consider the transformer-condenser combination 16, 18, which will now be termed a capacitor circuit. It will be convenient, for purposes of explantion, to substitute an equivalent capacitor circuit for this combination and such an equivalent circuit, as shown in FIG. 2, comprises simply a saturable inductor $L_e$ having in parallel therewith a capacitor having an effective capacitance $C_e$, which is $a^2$ times the actual capacitance of condenser 18.

As heretofore noted, the transformer 16 is not saturated under running conditions over normal load ranges. Hence, the reactance of $L_e$ is ideally infinite and may in any actual case be considered as very large compared with the reactance of $C_e$, so that the effect of $L_e$ may be neglected. The system therefore operates as if the effective capacitance $C_e$ were connected directly in series with the inductor 14, according to the principles described in my copending application. It will be understood that the inductor 14 is constructed to saturate under all normal load and speed conditions.

These conditions are represented by the vector diagram of FIG. 3, wherein the current through the capacitance $C_e$ is represented by $I_c$; this is the load current since the current through $L_e$ is considered negligible. If $X_c$ represents the reactance of the equivalent capacitor, the voltage across it is $I_c X_c$. Resistance effects are small and may be disregarded, so that the voltage is shown in quadrature with the current.

Under high current conditions, such as under overload or at starting, the transformer is constructed to saturate. Therefore, for load currents above a certain value, the characteristic of the equivalent inductor $L_e$ is that the voltage across it is nearly constant. The current through $L_e$ is now not negligible, since a substantial magnetizing current is drawn to maintain the flux under saturated conditions.

The current through the equivalent capacitor $C_e$ may then be represented by $I'_c$, which is shown as being somewhat greater than $I_c$ and the magnetizing current through $L_e$ is represented by $I'_L$. The residual current is $I_R$ which is the vector sum of $I'_c$ and $I'_L$. $I_R$ is the actual load current and is therefore the current through the primary of the transformer 16 in the actual circuit of FIG. 1.

The voltage across the equivalent condenser $C_e$ is $I'_c X_c$, which is also the voltage across the equivalent inductor $L_e$.

It will be observed that the load current $I_R$ is necessarily greater than any load current $I_c$ in the normal running range, and this increase in current is necessary to bring about saturation of the transformer core. Nevertheless, the current $I_R$ is less than the current $I'_c$ which would flow under overload or starting conditions if the saturating transformer were not present. The motor current is therefore limited to a certain maximum determined by the saturation characteristics of the transformer.

Another explanation of the operation is afforded by the fact that the voltage across a saturable reactor tends to be nearly constant for all currents in the saturable region. This means that the voltage $I'_c X_c$ has a limiting value, and since the reaction $X_c$, is sensibly constant, the current $I'_c$ will not exceed a limiting value.

By the use of this invention, not only is it possible to utilize a condenser of conveniently small capacitance, but safe limitation of current is provided for starting and overload conditions. It has been found in actual practice that even upon application of full line voltage, the starting current can usually be held to twice the full load current. Therefore, in most instances the use of a starting box or other conventional current-limiting means is avoided. In any case, the advantages of the invention described in my copending application are retained; thus for any given setting of the variable taps 12 and 20 and of the condenser 18, the motor operates at a substantially constant speed over a wide range of loads; also the speed setting may be changed by changing one or more of the variable parameters. The principles of operation of the system for speed control are fully described in my copending application and are not repeated here.

Having thus described my invention, I claim:

1. The combination with an electric motor, of a control circuit in series with the motor and having an inductor which is saturable within the normal operating range of the motor, a transformer having a primary in series with the inductor, the transformer having a secondary across which is connected a condenser, the transformer having a core which does not saturate within the normal range of current for operation of the motor but becomes saturated upon the passage through the transformer primary of a current in excess of normal operating current.

2. The combination with a direct current motor, an alternating current supply, and rectifying means for the motor, of a control circuit in series with the rectifying means and motor and comprising a saturable inductor capable of saturating within the range of normal load currents of the motor, an equivalent capacitive circuit in series with the inductor including a saturable transformer having its primary in series with the inductor and its secondary connected to a condenser, the transformer having a ratio greater than unity, the transformer having a core which saturates only upon the passage of a current in excess of normal load currents of the motor.

References Cited in the file of this patent

UNITED STATES PATENTS

| | | |
|---|---|---|
| 1,325,324 | Holliday | Dec. 16, 1919 |
| 2,222,714 | Kramer | Nov. 26, 1940 |
| 2,622,239 | Bracutt | Dec. 16, 1952 |